May 5, 1964  F. J. MARINO  3,131,452
SAFETY HOOKS
Filed Dec. 27, 1961

INVENTOR.
Frank J. Marino
BY
*Philip E. Hilbert*
ATTORNEY

United States Patent Office 3,131,452
Patented May 5, 1964

3,131,452
SAFETY HOOKS
Frank J. Marino, Brooklyn, N.Y., assignor to L. Marino, Inc., Brooklyn, N.Y., a corporation of New York
Filed Dec. 27, 1961, Ser. No. 162,473
7 Claims. (Cl. 24—230.5)

This invention relates to safety hooks and more particularly concerns hooks used for loading carbo or other heavy objects and unloading the same.

In marine loading operations as well as other operations involving loading and unloading heavy objects, the load is usually suspended from a hook which in turn is attached to a chain or the like, which is hoisted or lowered by winches or other suitable hoisting and lowering gear. In normal operations of this type, the moving load or its suspending hook may encounter various projections such as hatch edges, rigging, booms or the like.

Such encounters may result in a tilt of the hook to an extent which will cause an accidental release of the load or cargo carried thereby, with consequent damage to the falling load or even injury to personnel in the vicinity of the loading or unloading operations.

While various forms of hooks have been suggested which will avoid accidental displacement of the load from its suspending hook; known forms of such hooks are either difficult to manipulate when engaging or disengaging the load, or they are of a construction which is still susceptible to disengagement from the suspended load under certain environmental conditions.

Accordingly, an object of this invention is to provide an improved safety hook which lends itself to rapid engagement or disengagement with a sling load, yet automatically resists separation from the sling load upon encountering various projections.

Another object of this invention is to provide safety hooks of the character described, which carry very heavy loads, yet are of a relatively simple construction, readily manufactured and manipulated and are extremely effective in avoiding accidental separation of the load from the hook carrying the same.

Other objects of this invention will in part be obvious and in part hereinafter pointed out.

Figure 1:
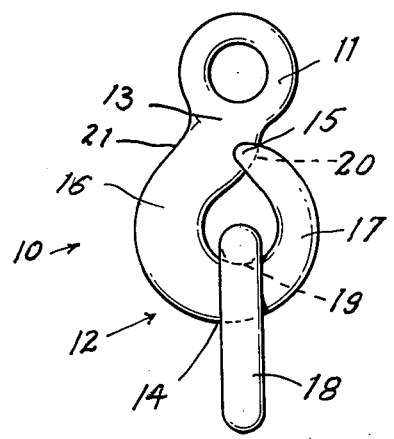
FIG. 1 is a side elevational view of a safety hook embodying the invention.
Figure 2:
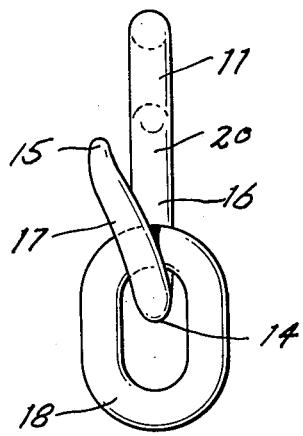
FIG. 2 is an end view thereof.

The safety hook 10, embodying the invention, shown in FIGS. 1, 2; comprises an eye portion 11 of substantially uniform cross sectional area, and a curved hook portion 12 extending from eye portion 11. Hook portion 12 has a somewhat uniform cross section from its juncture with eye portion 11 at 13 to a midpoint thereof as at 14. Thereafter hook portion 12 progressively diminishes in its cross sectional area to tip 15.

The hook portion 12 comprises essentially a body portion 16 extending from juncture point 13 to midpoint 14, said portion 16 being substantially coplanar with eye portion 11. Hook portion 12 further includes a tip portion 17 which extends from midpoint 14 to tip 15, said tip portion 17 being angularly displaced to one side of body portion 16.

It will be apparent from a consideration of FIG. 2, that tip 15 is spaced from body portion 16 so as to allow a suspending link 18 to be readily passed over said tip to and from its load carrying position wherein said link 18 engages the bight 19 of hook portion 12. Furthermore tip 15 terminates at a point slightly overlapping the inner edge 20 of hook body portion 16 adjacent juncture point 13. Also, tip 15 is located inwardly of the outer edge 21 of said hook body portion 16.

Thus, the link 18 will be retained on hook 10 and accidental or inadvertent separation of the link 18 from hook 10 is avoided, despite any change in position of said hook 10 during normal loading or unloading operations. Also, tip 15 is so located as to avoid engagement with projections which would tend to move the hook to positions which might cause separation of the link 18 therefrom.

Figure 3:
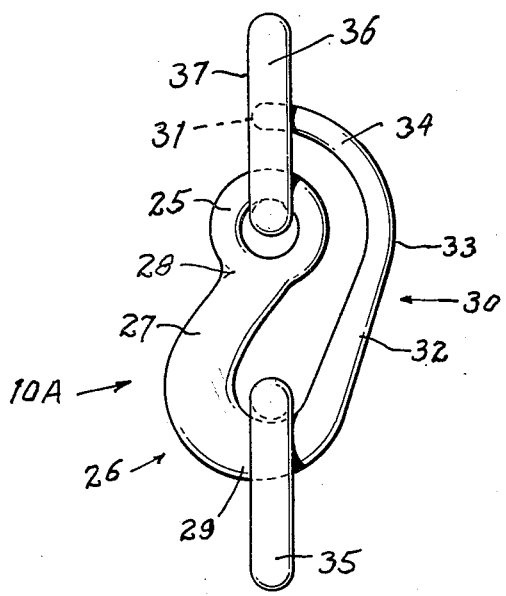
FIG. 3 is a side elevational view of another safety hook embodying the invention.
Figure 4:
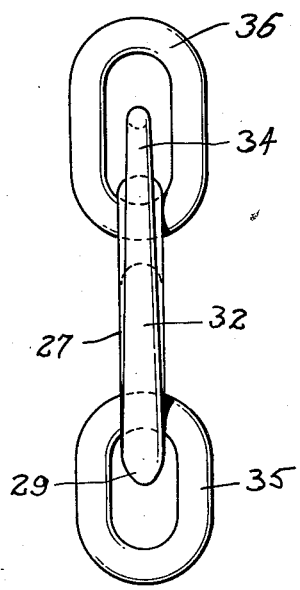
FIG. 4 is an end view thereof.

The safety hook 10A shown in FIGS. 3 and 4 comprises an eye portion 25 and a body portion 26 extending from eye portion 25 and substantially coplanar therewith. Body portion 26 comprises a substantially thickened portion 27 extending from a juncture point 28 with eye portion 25 to a bight point 29. From bight point 29, body portion 26 comprises a hook portion 30 of somewhat reduced cross sectional area which terminates in a tip 31.

The hook portion 30 comprises a substantially linear portion 32 which extends from bight point 29 to a point 33 opposite eye portion 25, and thereafter an arcuate portion 34 which locates tip 31 above and in spaced relation to eye portion 25. A load engaging link 35 is disposed on body portion 26 and is located on bight point 29, while a hoisting link 36 is mounted on eye portion 25.

It will be apparent from a consideration of FIG. 3, that hook tip 31 is disposed within the opening of hoisting link 36 and does not project beyond the lateral surface portion 37 thereof. Furthermore, the curvature of body portion 26 and the disposition of bight point 29 in vertical alignment with the center of eye portion 25, insures proper disposition of the hook tip 31 within link 36 when the hook is fully loaded.

Furthermore, despite any unforeseen changes in position of hook 10A, there is practically no likelihood of disengagement of link 35 from hook portion 30. However, link 35 is readily engaged or disengaged from hook 10A when desired, by suitable rotation of link 36 relative to hook tip 31.

It is understood that the cross sectional areas of hooks 10 and 10A are suitably proportioned to the indicated load capacity thereof.

As various changes might be made in the embodiments of the invention herein disclosed without departing from the spirit thereof, it is understood that all matter herein shown or described shall be deemed illustrative and not by way of limitation except as set forth in the appended claims.

What is claimed is:

1. A safety hook consisting of an eye portion and a body portion extending from said eye portion and terminating in a free tip, said body portion consisting of opposed curved side portions located on opposite sides of a vertical median plane passing through the center of said eye portion, and a curved bight portion connecting the lower ends of said side body portions, said free tip being located in closely spaced relation to said eye portion, the midportions of said eye portion and bight portion and the terminal end of said free tip being in aligned relation to said vertical median plane.

2. A hook as in claim 1 wherein said free tip is laterally offset relative to said eye portion and overlies the upper end of one side body portion adjacent its juncture with said eye portion, said free tip being adjacent the inner edge of said one body portion and remote from the outer edge thereof.

3. A safety hook as in claim 1 wherein said body portions are disposed in a common plane, the side body portion including said free tip having a straight section extending upwardly and outwardly from said bight portion and a curved section extending upwardly and inwardly from the upper end of said straight section, said curved section terminating in said free tip.

4. A safety hook as in claim 1 and further including a hoisting link mounted on said eye portion, said body portion comprising a thickened portion extending from said eye portion to the bight thereof and a portion of reduced cross sectional area extending from said bight to a free tip thereof, said tip being disposed within said hoisting link in the vertical hoisting position thereof.

5. A safety hook as in claim 4 wherein said second mentioned body portion comprises an elongated substantially linear portion extending from said bight and an arcuate portion terminating in said tip.

6. A safety hook consisting of an eye portion, a body portion extending from said eye portion and terminating in a free tip, said body portion comprising oppositely disposed side curved portions located on opposite sides of a vertical median plane passing through said eye portion, the side body portion extending from said eye portion to the bight portion connecting said side body portions being of substantially uniform heavy cross section, the side body portion extending from said bight portion and terminating in said free tip being of progressively reduced cross section from said bight portion to said tip, the midportions of said eye portion and bight portion and the terminal end of said free tip being in aligned relation with said vertical median plane.

7. A safety hook as in claim 6 wherein said free tip is in overlying relation to one surface of said first mentioned side body portion and adjacent the inner edge thereof at a point adjacent the juncture thereof with said eye portion.

References Cited in the file of this patent

UNITED STATES PATENTS

| | | |
|---|---|---|
| 222,241 | Camp | Dec. 21, 1879 |
| 485,104 | Chapelle | Oct. 25, 1892 |
| 552,227 | Baptist | Dec. 31, 1895 |
| 840,473 | Brouse | Jan. 8, 1907 |
| 1,072,285 | Wigley | Sept. 2, 1913 |
| 1,260,350 | Edeborg | Mar. 26, 1918 |
| 1,384,217 | Starkey | July 12, 1921 |
| 1,513,419 | Power | Oct. 28, 1924 |
| 1,649,655 | Benson | Nov. 15, 1927 |
| 2,184,812 | Hendrix | Dec. 26, 1939 |
| 2,302,198 | Ehmann | Nov. 17, 1942 |

FOREIGN PATENTS

| | | |
|---|---|---|
| 26,227 | Great Britain | 1902 |
| 64,008 | Germany | Aug. 22, 1892 |
| 6,085 | Great Britain | 1914 |